(12) United States Patent
Kim

(10) Patent No.: US 10,424,820 B2
(45) Date of Patent: Sep. 24, 2019

(54) BATTERY MODULE

(71) Applicant: SAMSUNG SDI CO., LTD., Yongin-si, Gyeonggi-do (KR)

(72) Inventor: Hanho Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 3 days.

(21) Appl. No.: 15/602,346

(22) Filed: May 23, 2017

(65) Prior Publication Data

US 2017/0346146 A1    Nov. 30, 2017

(30) Foreign Application Priority Data

May 25, 2016 (KR) .................. 10-2016-0064324

(51) Int. Cl.
| | |
|---|---|
| *H01M 10/6554* | (2014.01) |
| *H01M 10/6556* | (2014.01) |
| *H01M 10/613* | (2014.01) |
| *H01M 10/625* | (2014.01) |
| *H01M 2/10* | (2006.01) |
| *H01M 10/6568* | (2014.01) |

(52) U.S. Cl.
CPC ..... *H01M 10/6554* (2015.04); *H01M 2/1077* (2013.01); *H01M 10/613* (2015.04); *H01M 10/625* (2015.04); *H01M 10/6556* (2015.04); *H01M 10/6568* (2015.04); *H01M 2220/20* (2013.01)

(58) Field of Classification Search
CPC .................................................. H01M 10/60
See application file for complete search history.

(56) References Cited

U.S. PATENT DOCUMENTS

| | | | |
|---|---|---|---|
| 2009/0246606 A1 | 10/2009 | Shimizu | |
| 2012/0121959 A1 | 5/2012 | Yamada | |
| 2012/0261107 A1* | 10/2012 | Prinz | H01M 2/1083 165/185 |
| 2012/0312610 A1 | 12/2012 | Kim et al. | |
| 2013/0011713 A1* | 1/2013 | Harada | H01M 2/1077 429/120 |

(Continued)

FOREIGN PATENT DOCUMENTS

| | | |
|---|---|---|
| EP | 0542534 A1 | 5/1993 |
| EP | 2337142 A1 | 6/2011 |

(Continued)

OTHER PUBLICATIONS

EPO Extended Search Report dated Nov. 28, 2017, for corresponding European Patent Application No. 17172605.2 (18 pages).

(Continued)

*Primary Examiner* — James Lee
(74) *Attorney, Agent, or Firm* — Lewis Roca Rothgerber Christie LLP

(57) ABSTRACT

A battery module includes battery packs. Heat may be efficiently dissipated from the battery packs of the battery module, and heat dissipating efficiency may not vary according to positions of the battery packs; that is, heat may be uniformly dissipated. In addition, leakage of a cooling medium for dissipating heat may be prevented, and permeation of the cooling medium into the battery packs may be prevented.

20 Claims, 10 Drawing Sheets

(56) References Cited

U.S. PATENT DOCUMENTS

2016/0079640 A1   3/2016  Kim
2016/0093870 A1   3/2016  DeKeuster et al.
2016/0372805 A1*  12/2016 Kim .................. H01M 10/6556

FOREIGN PATENT DOCUMENTS

| EP | 2337143 A2 | 6/2011 |
| EP | 2637248 A1 | 9/2013 |
| JP | 2008-062875 A | 3/2008 |
| JP | 2013-246990 A | 12/2013 |
| JP | 2015-103324 A | 6/2015 |
| JP | 2015-107728 A | 6/2015 |
| KR | 10-2010-0131694 A | 12/2010 |
| KR | 10-2012-0136923 A | 12/2012 |

OTHER PUBLICATIONS

EPO Partial Search Report dated Aug. 4, 2017, for corresponding European Patent Application No. 17172605.2 (15 pages).

\* cited by examiner

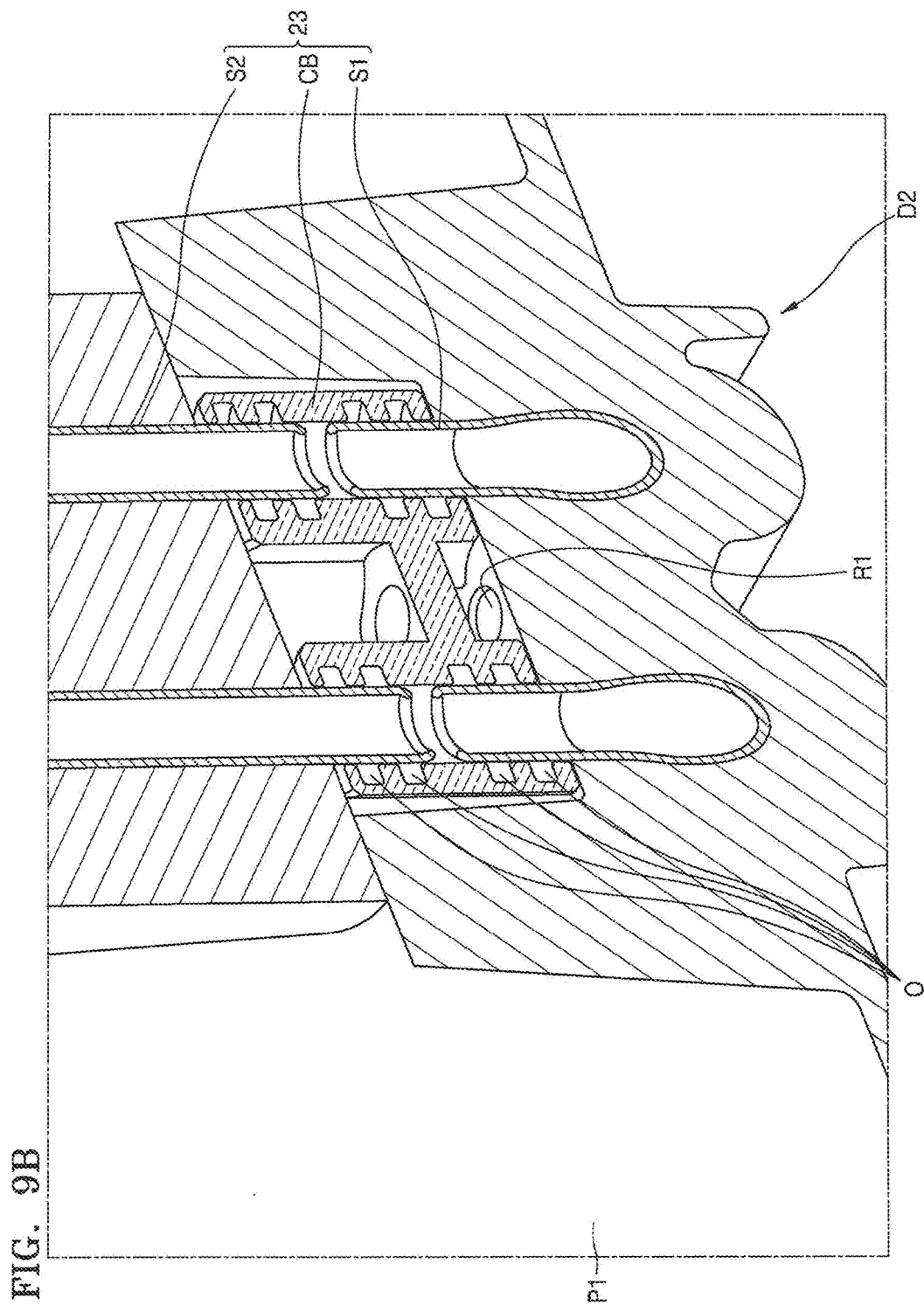

BATTERY MODULE

CROSS-REFERENCE TO RELATED APPLICATION

This application claims priority to and the benefit of Korean Patent Application No. 10-2016-0064324, filed on May 25, 2016 in the Korean Intellectual Property Office, the entire disclosure of which is incorporated herein by reference.

BACKGROUND

1. Field

Aspects of embodiments relate to a battery module.

2. Description of the Related Art

Unlike primary batteries, secondary batteries are rechargeable. Secondary batteries are used as energy sources of devices, such as mobile devices, electric vehicles, hybrid vehicles, electric bicycles, or uninterruptible power supplies. Secondary batteries or secondary battery modules each including a plurality of secondary batteries connected as a unit are used according to the types of external devices using secondary batteries.

Small mobile devices, such as cellular phones, may be operated using secondary batteries for a predetermined time. However, high-power, high-capacity secondary battery modules, each including a plurality of secondary batteries, may be suitable for devices such as electric vehicles or hybrid vehicles having long operation times and consuming large amounts of electricity. The output voltage or current of a secondary battery module may be increased by adjusting the number of secondary batteries included in the battery module.

SUMMARY

According to an aspect of one or more embodiments, a battery module includes a plurality of battery packs and is capable of uniformly dissipating heat from the battery packs, the battery module being configured to efficiently dissipate heat from the battery packs without variations in heat dissipating efficiency according to the positions of the battery packs.

According to another aspect of one or more embodiments, a battery module is configured to prevent or substantially prevent leakage of a cooling medium and permeation of the cooling medium into battery packs.

The battery module according to one or more embodiments may be configured to support and cool the battery packs using cooling plates in which cooling tubes are integrally embedded. Since the cooling plates and the cooling tubes having high thermal conductivity are integrally coupled to each other, heat may be efficiently transferred to a cooling medium flowing in the cooling tubes with low heat transfer resistance. In addition, since passages for a cooling medium are formed in the cooling plates supporting the battery packs, an additional space for a cooling structure is not required, and thus the battery module may have a compact structure. In addition, since the cooling tubes are embedded in the cooling plates together with connection structures for a cooling medium, the connection structures are surrounded by the cooling plates, and thus leakage through the connection structures may be prevented or substantially prevented. According to one or more embodiments, leakage of the cooling medium through the connection structures may be prevented, and a structure for draining a leaking fluid is provided, thereby preventing or substantially preventing permeation of leakage into the battery packs.

Additional aspects will be set forth, in part, in the description which follows and, in part, will be apparent from the description, or may be learned by practice of the presented embodiments.

According to one or more embodiments, a battery module includes: a first cooling plate supporting a first group of battery packs, and a first cooling tube embedded in the first cooling plate; a second cooling plate supporting a second group of battery packs, and a second cooling tube embedded in the second cooling plate; and a third cooling plate supporting a third group of battery packs, and a third cooling tube embedded in the third cooling plate, and the second cooling plate is arranged at a second level higher than a first level of the first cooling plate defining a bottom of the battery module.

In one or more embodiments, the third cooling plate may be arranged at a third level higher than the first level.

In one or more embodiments, the second cooling plate and the third cooling plate may be spaced apart from each other.

In one or more embodiments, the second cooling plate may extend in parallel with a lengthwise part of the first cooling plate, the lengthwise part extending in a first direction, and the third cooling plate may extend in parallel with a widthwise part of the first cooling plate, the widthwise part extending in a second direction.

In one or more embodiments, the first cooling tube and the second cooling tube may be connected to each other through a front branch part, and the first cooling tube and the third cooling tube may be connected to each other through a rear branch part.

In one or more embodiments, the first cooling tube may include: a passage passing through the rear branch part and connected to the third cooling tube; and a bypass passage bypassing the rear branch part.

In one or more embodiments, the passage passing through the rear branch part may have a diameter greater than a diameter of the bypass passage.

In one or more embodiments, the passage passing through the rear branch part may have a largest diameter among the first to third cooling tubes.

In one or more embodiments, a drain hole may be formed in a region adjacent to the rear branch part to discharge a fluid through the rear branch part.

In one or more embodiments, the drain hole may be formed in the first cooling plate below the rear branch part.

In one or more embodiments, the first cooling tube, the second cooling tube, and an external connection tube may be connected to the front branch part.

In one or more embodiments, the second cooling tube may have a diameter smaller than a diameter of the first cooling tube.

In one or more embodiments, the second cooling tube may have a smallest diameter among the first to third cooling tubes.

In one or more embodiments, the front branch part to which the first cooling tube and the second cooling tube are connected may be arranged outside a battery pack accommodation space, and the rear branch part to which the first cooling tube and the third cooling tube are connected may be arranged in the battery pack accommodation space.

In one or more embodiments, the battery module may further include a cover facing the first cooling plate and coupled to the first cooling plate, wherein the first cooling plate and the cover may together define the battery pack accommodation space.

In one or more embodiments, each of the first to third cooling tubes may include a plurality of tubes extending in parallel with each other, and the battery module may further include a fixing block combining the plurality of tubes of each of the first to third cooling tubes.

In one or more embodiments, the fixing block may include: upper and lower units facing each other and coupled to each other with the plurality of tubes therebetween; and a coupling unit fastening the upper and lower units to each other.

In one or more embodiments, the fixing block may include a same metal as that included in the first to third cooling plates.

In one or more embodiments, the fixing block may be exposed at least one of upper and lower surfaces of the first to third cooling plates.

In one or more embodiments, the first to third cooling plates may include a first metal, and the first to third cooling tubes may include a second metal having a melting point higher than a melting point of the first metal.

BRIEF DESCRIPTION OF THE DRAWINGS

The above and/or other aspects will become apparent and more readily appreciated from the following description of some embodiments, taken in conjunction with the accompanying drawings, in which:

FIGS. 9A and 9B are cross-sectional views taken along line IX-IX of FIG. 3, illustrating a double sealing structure and a drain hole for a rear branch part.

DETAILED DESCRIPTION

Figure 1:
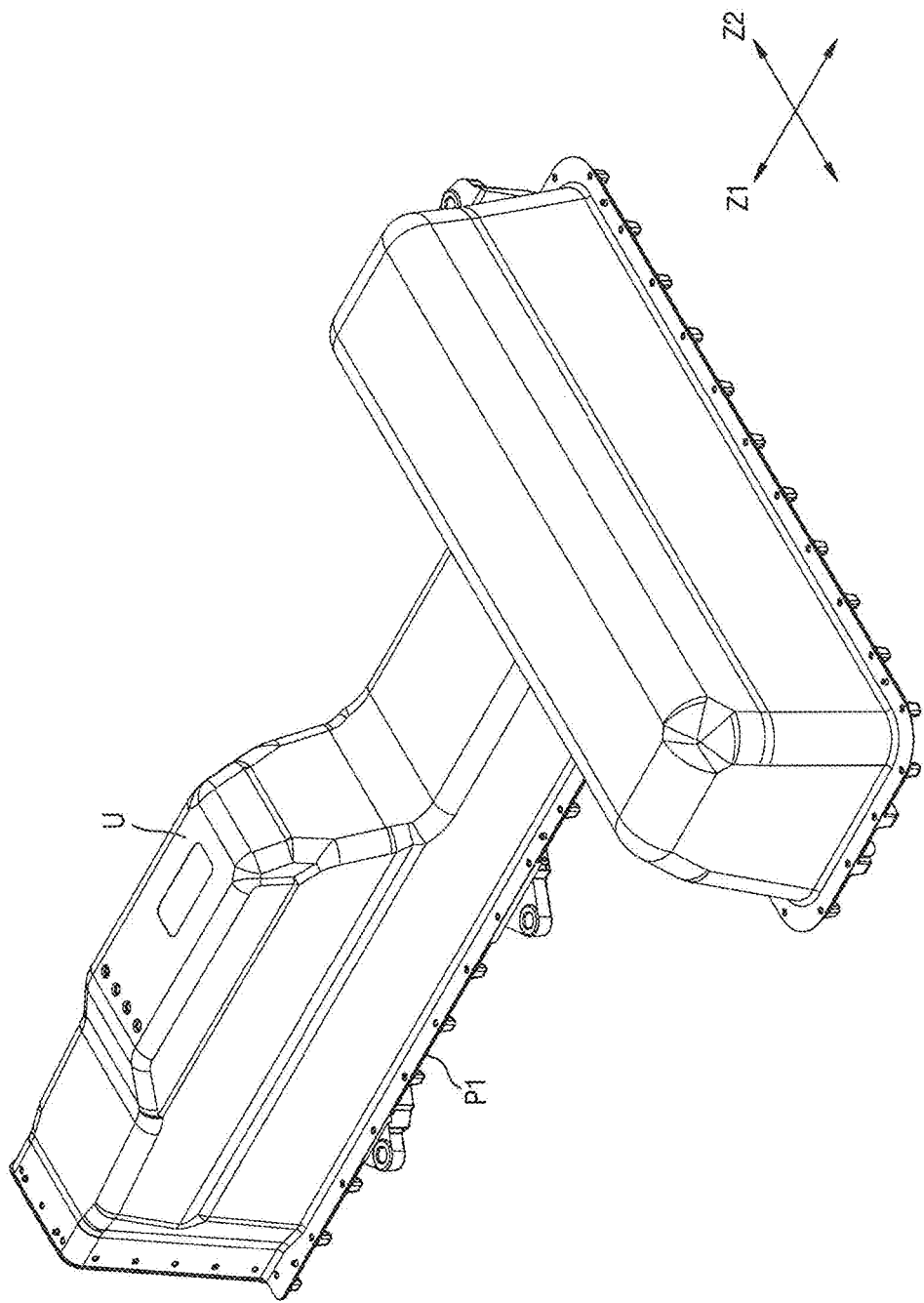
FIG. 1 is a perspective view illustrating a battery module according to an embodiment.

Reference will be made in further detail to some embodiments, examples of which are illustrated in the accompanying drawings, wherein like reference numerals refer to like elements throughout. In this regard, the present embodiments may have different forms and should not be construed as being limited to the descriptions set forth herein. Accordingly, some embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a battery module according to an embodiment.

Referring to FIG. 1, the battery module may include a first cooling plate P1 arranged at a bottom thereof and a plurality of battery packs arranged on the first cooling plate P1. The battery module may also include a cover U facing the first cooling plate P1 and coupled to the first cooling plate P1 to form a battery pack accommodation space and protect the battery packs from external environmental factors. The first cooling plate P1 and the cover U may have a same shape, such as a T-shape extending in different directions (e.g., first and second directions Z1 and Z2), and thus the first cooling plate P1 and the cover U may be coupled to each other in a mutually-facing direction.

Figure 2:
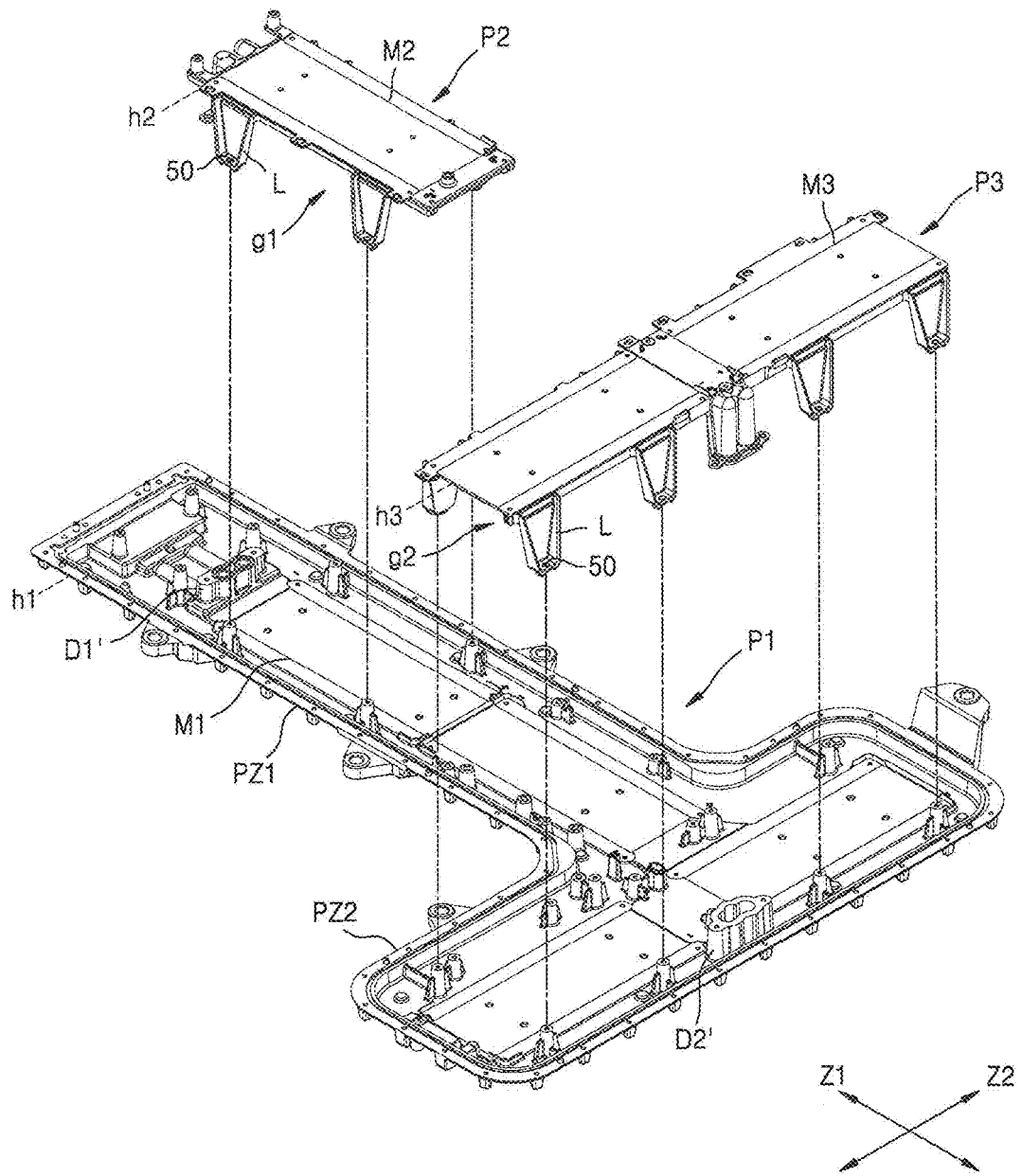
FIG. 2 is an exploded perspective view illustrating an inside structure of the battery module depicted in FIG. 1.
Figure 3:
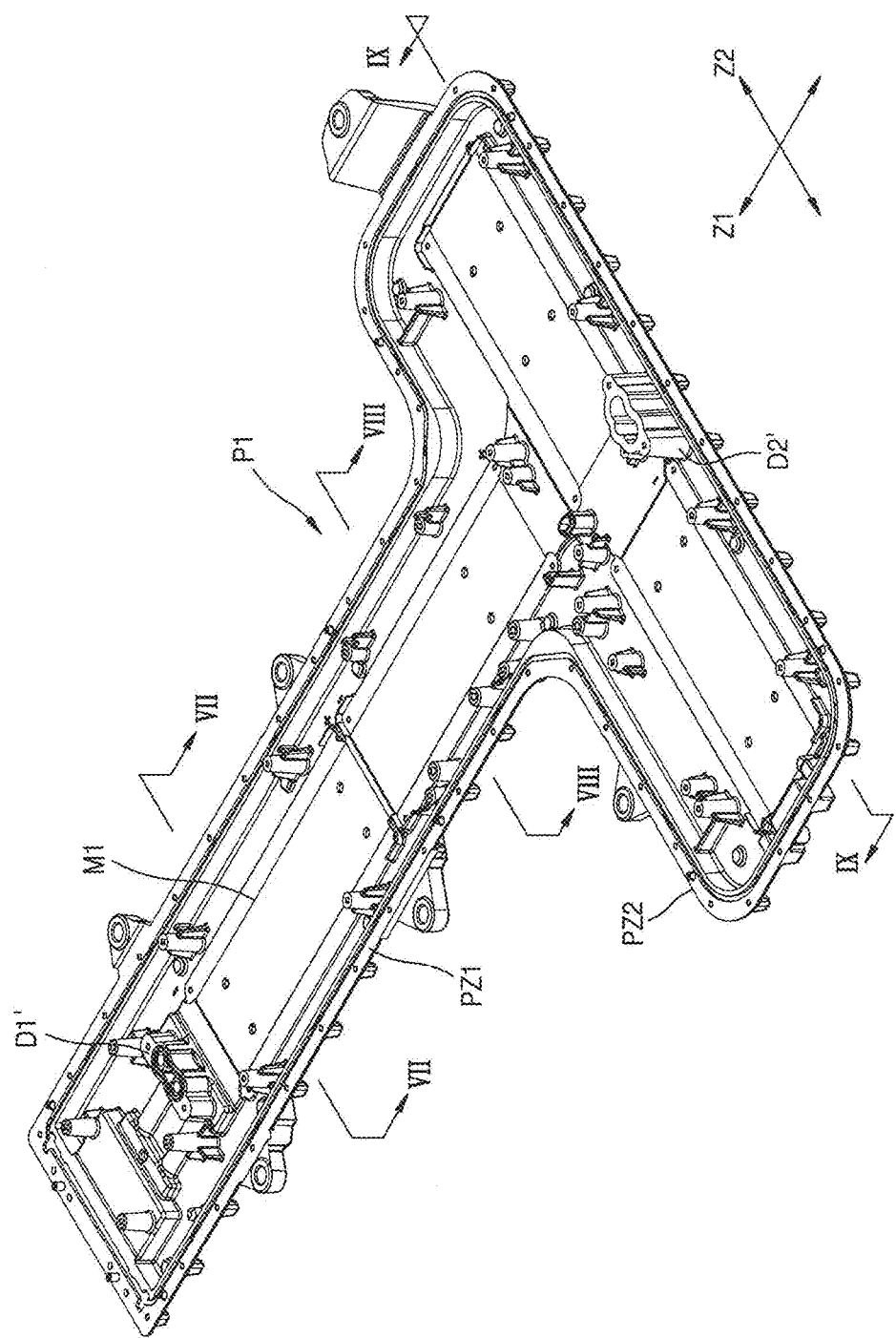
FIGS. 3 to 5 are perspective views respectively illustrating first to third cooling plates depicted in FIG. 2.
Figure 4:
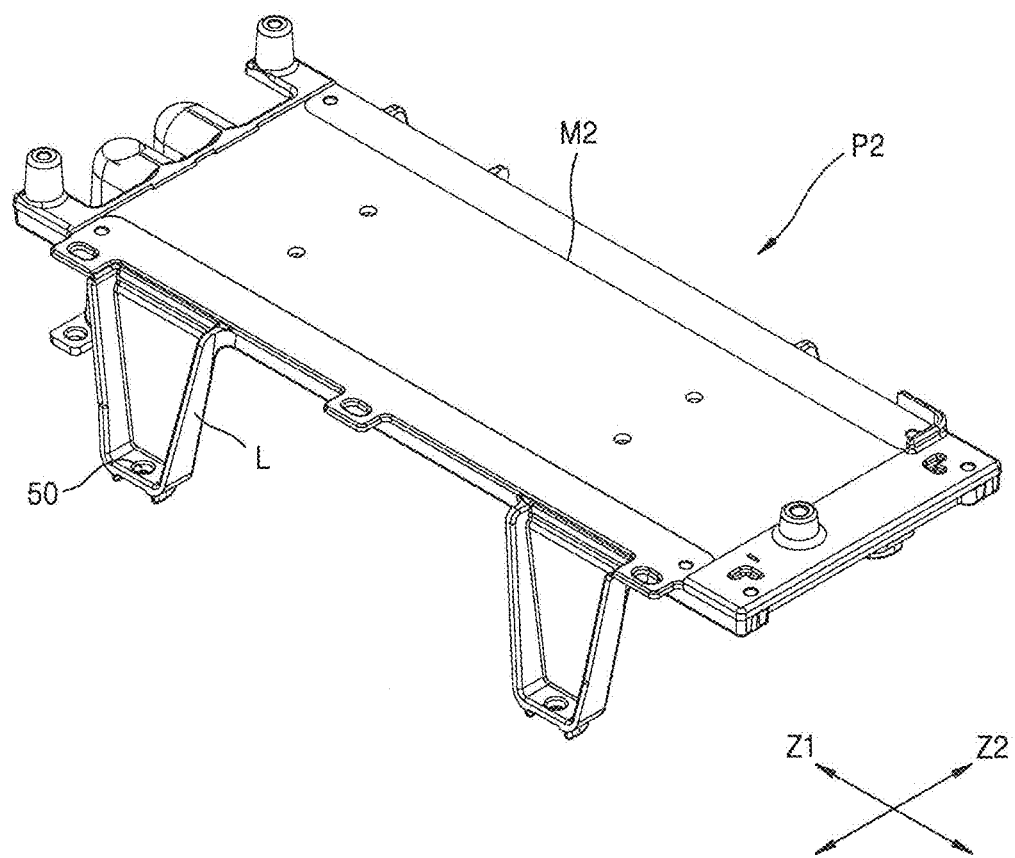
Figure 5:
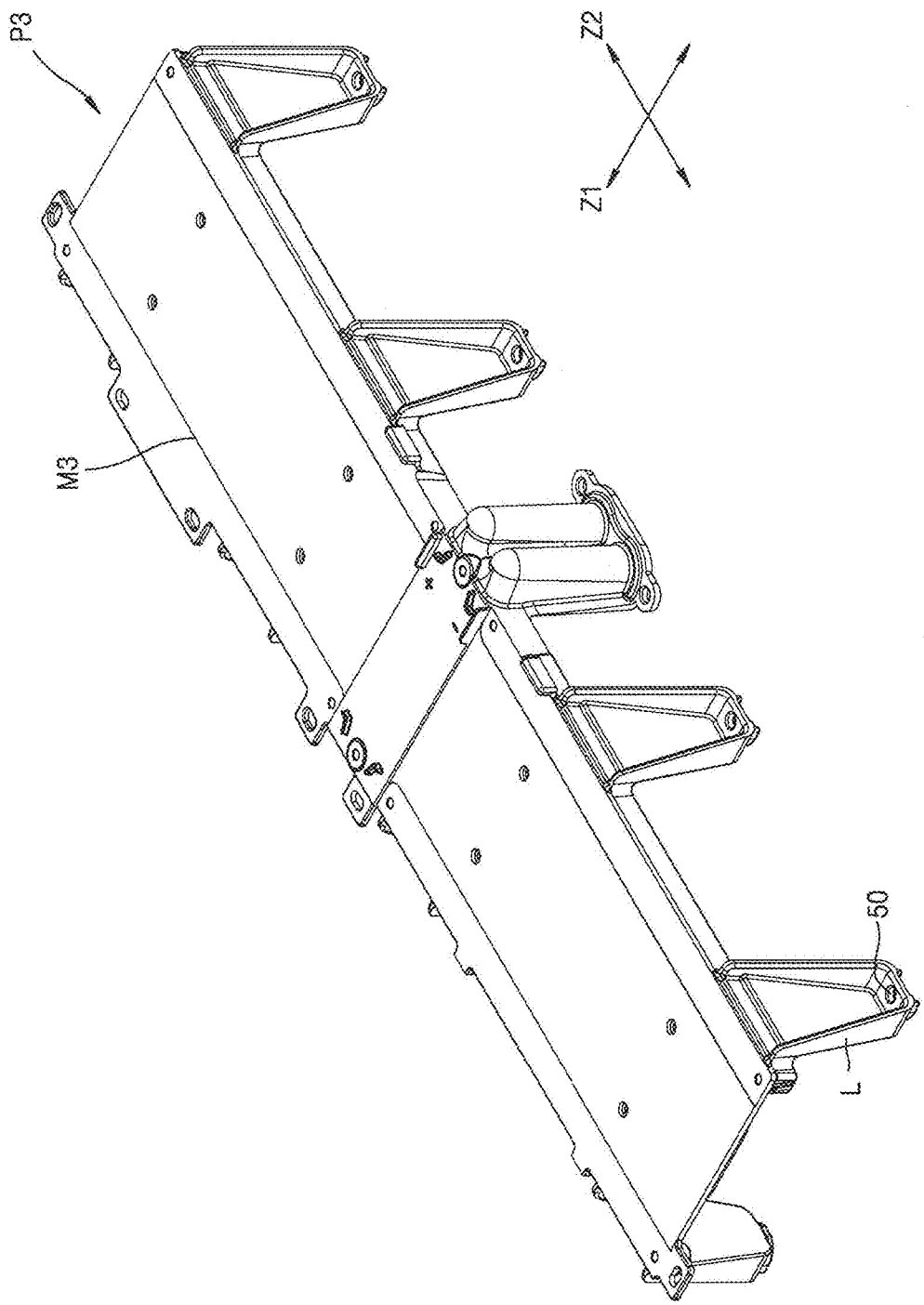

FIG. 2 is an exploded perspective view illustrating an inside structure of the battery module depicted in FIG. 1. FIGS. 3 to 5 are perspective views illustrating first to third cooling plates P1 to P3 depicted in FIG. 2.

Referring to FIGS. 2 to 5, the second cooling plate P2 may be spaced apart from an upper side of the first cooling plate P1 with a pack accommodation region g1 therebetween, and the third cooling plate P3 may be spaced apart from the upper side of the first cooling plate P1 with a pack accommodation region g2 therebetween.

The first to third cooling plates P1 to P3 may be directly in contact with battery packs M1 to M3 for dissipating heat from the battery packs M1 to M3. The first to third cooling plates P1 to P3 may support the battery packs M1 to M3 and dissipate heat from the battery packs M1 to M3. For example, the first cooling plate P1 may be placed at a first level h1 corresponding to the bottom of the battery module to support a first group of battery packs M1 and dissipate heat from the first group of battery packs M1. In addition, the second cooling plate P2 may be placed at a second level h2 higher than the first level h1 to support a second group of battery packs M2 and dissipate heat from the second group of battery packs M2. In addition, the third cooling plate P3 may be placed at a third level h3 higher than the first level h1 to support a third group of battery packs M3 and dissipate heat from the third group of battery packs M3. In FIG. 2, installation places of the first to third groups of battery packs M1 to M3 are indicated instead of illustrating the first to third groups of battery packs M1 to M3 for conciseness of illustration.

The first to third groups of battery packs M1 to M3 may each include at least one battery pack and may include different numbers of battery packs. In an embodiment, the first group of battery packs M1 placed at the first level h1 corresponding to the bottom of the battery module may include the largest number of battery packs, and the second group of battery packs M2 may include the fewest battery packs. The third group of battery packs M3 may include battery packs fewer than the first group of battery packs M1 but more than the second group of battery packs M2.

In an embodiment, for example, the first group of battery packs M1 placed on the first cooling plate P1 may include four battery packs. As described later, the first cooling plate P1 may include a lengthwise part PZ1 extending in the first direction Z1 and a widthwise part PZ2 extending in the second direction Z2. In an embodiment, two battery packs may be arranged on the lengthwise part PZ1 in the first direction Z1, and two battery packs may be arranged on the widthwise part PZ2 in the second direction Z2. In an embodiment, the second group of battery packs M2 arranged on the second cooling plate P2 may include one battery pack. The second cooling plate P2 may extend in the first direction Z1, and one battery pack may be arranged on the second cooling plate P2 in the first direction Z1. In an embodiment, the third group of battery packs M3 arranged on the third cooling plate P3 may include two battery packs. The third cooling plate P3 may extend in the second direction Z2, and two battery packs may be arranged on the third cooling plate P3 in the second direction Z2.

As described later, according to an embodiment, first to third cooling tubes C1 to C3 (refer to FIG. 6) for dissipating heat from the first to third groups of battery packs M1 to M3 may have a diameter, number, interval, or the like, so as to uniformly dissipate heat from the battery packs M1 to M3. Here, each of the first to third cooling tubes C1 to C3 may include a plurality of tubes, and the term "number" and "interval" may refer to the number of the plurality of tubes and the interval between the plurality of tubes.

If heat is relatively poorly dissipated from some battery packs of the battery module, the performance and life span of the battery packs may decrease, and thus the performance and life span of the battery module may also decrease. To prevent or substantially prevent this, uniform heat dissipation may be obtained for the battery packs of the battery module.

The first cooling plate P1 includes the lengthwise part PZ1 extending in the first direction Z1 and the widthwise part PZ2 extending in the second direction Z2 different from the first direction Z1. In an embodiment, for example, the lengthwise part PZ1 and the widthwise part PZ2 respectively extending in the first and second directions Z1 and Z2 may be perpendicular to each other. In this case, the first cooling plate P1 may have a T-shape.

The second cooling plate P2 may be spaced apart from an upper side of the lengthwise part PZ1 of the first cooling plate P1 with the pack accommodation region g1 therebetween. In an embodiment, the lengthwise part PZ1 of the first cooling plate P1 and the second cooling plate P2 may be parallel to each other in the first direction Z1. The third cooling plate P3 may be spaced apart from an upper side of the widthwise part PZ2 of the first cooling plate P1 with the pack accommodation region g2 therebetween. In an embodiment, the widthwise part PZ2 of the first cooling plate P1 and the third cooling plate P3 may be parallel to each other in the second direction Z2. In an embodiment, the second cooling plate P2 and the third cooling plate P3 may be spaced apart from each other.

The first cooling plate P1 may form the bottom of the battery module and may function as a base structure of the battery module. That is, the second and third cooling plates P2 and P3 may be supported above the first cooling plate P1. In an embodiment, legs L may be provided on the second and third cooling plates P2 and P3 to support the second and third cooling plates P2 and P3 above the first cooling plate P1. That is, the legs L may be provided between the first and second cooling plates P1 and P2 and between the first and third cooling plates P1 and P3 so as to support the second and third cooling plates P2 and P3 above the first cooling plate P1 with the respective pack accommodation regions g1 and g2 therebetween. Coupling holes 50 may be formed in the legs L protruding from the second and third cooling plates P2 and P3, and coupling members (not shown) may be coupled to the first cooling plate P1 through the coupling holes 50 so as to fix the second and third cooling plates P2 and P3.

The first cooling plate P1 to which the second and third cooling plates P2 and P3 are fixed may be covered with the cover U (refer to FIG. 1). The cover U may seal the first to third groups of battery packs M1 to M3 arranged on the first to third cooling plates P1 to P3 to protect the first to third groups of battery packs M1 to M3 from external environmental factors. That is, the first cooling plate P1 and the cover U may be coupled to each other in a mutually-facing direction, and the battery pack accommodation space may be formed between the first cooling plate P1 and the cover U to accommodate the first to third groups of battery packs M1 to M3. The first cooling plate P1 and the cover U may have a same shape, such as a T-shape, so as to be coupled to each other in a mutually-facing direction.

Figure 6:
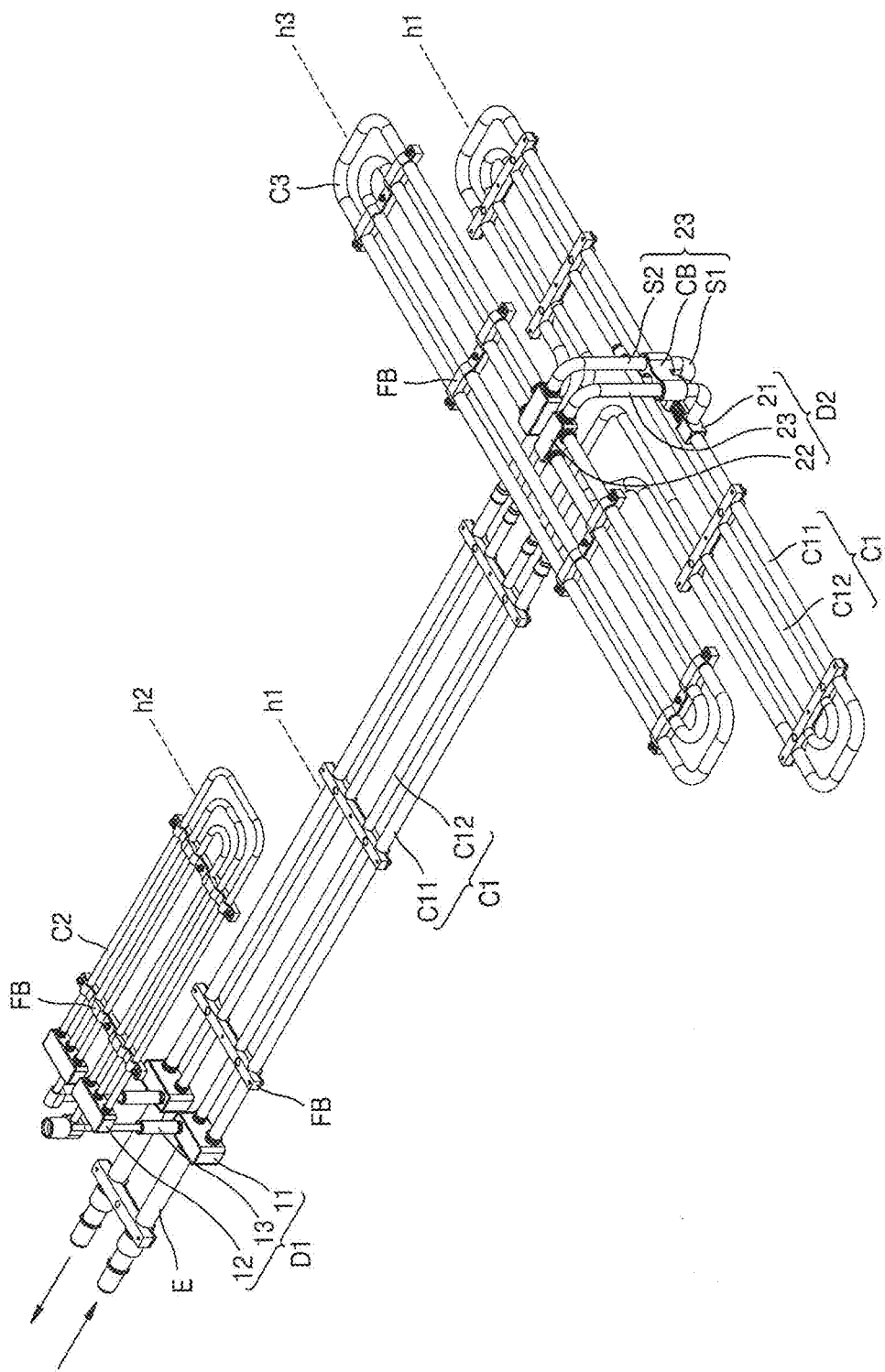
FIG. 6 is a perspective view illustrating structures of first to third cooling tubes embedded in the first to third cooling plates.
Figure 7:
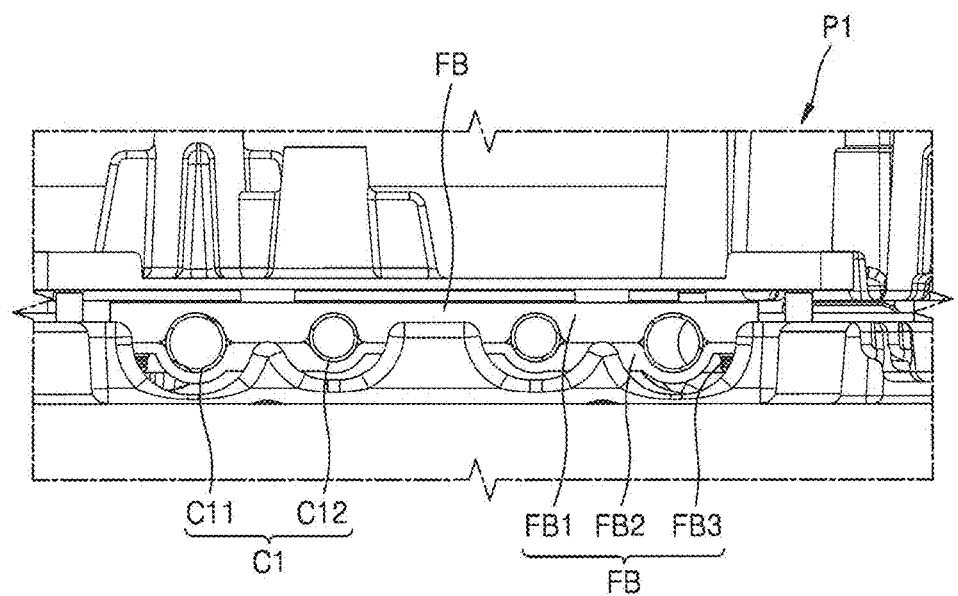
FIG. 7 is a cross-sectional view taken along line VII-VII of FIG. 3, illustrating the first cooling plate and the first cooling tube embedded in the first cooling plate.
Figure 8:
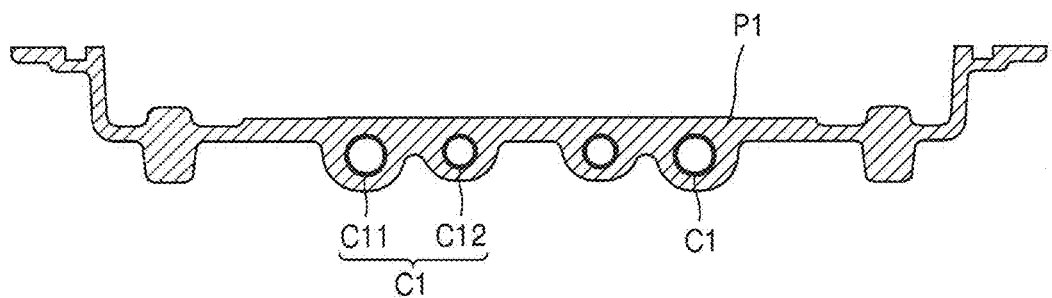
FIG. 8 is a cross-sectional view taken along line VIII-VIII of FIG. 3, illustrating the first cooling plate and the first cooling tube embedded in the first cooling plate.

FIG. 6 illustrates the first to third cooling tubes C1 to C3 embedded in the first to third cooling plates P1 to P3. FIGS. 7 and 8 are cross-sectional views taken along lines VII-VII and VIII-VIII, respectively, of FIG. 3, illustrating the first cooling plate P1 and the first cooling tube C1 embedded in the first cooling plate P1.

Referring to FIGS. 2, 6, and 7, the first to third cooling plates P1 to P3 may support the battery packs M1 to M3 and may make thermal contact with the battery packs M1 to M3, for example, direct contact with the battery packs M1 to M3, in order to dissipate heat from the battery packs M1 to M3. To this end, the first to third cooling tubes C1 to C3 may be embedded in the first to third cooling plates P1 to P3. The first to third cooling tubes C1 to C3 may be integrally embedded in the first to third cooling plates P1 to P3.

In an embodiment, the first to third cooling tubes C1 to C3 may include a metallic material different from a metallic material included in the first to third cooling plates P1 to P3, and the first to third cooling tubes C1 to C3 may be formed by die casting. For example, the first to third cooling plates P1 to P3 may be formed by casting a molten steel into a die (not shown) in which the first to third cooling tubes C1 to C3 are fixed. In this manner, the first to third cooling plates P1 to P3 in which the first to third cooling tubes C1 to C3 are integrally embedded may be obtained. The first to third cooling tubes C1 to C3 may include a metallic material different from a metallic material included in the first to third cooling plates P1 to P3. In an embodiment, for example, the first to third cooling tubes C1 to C3 may include a stainless steel having a relatively high melting point, and the first to third cooling plates P1 to P3 may include an aluminum material having a relatively low melting point. For example, in a state in which the first to third cooling tubes C1 to C3 including a stainless steel are temporarily fixed to an inside of a die (not shown), molten aluminum may be injected into the die. At this time, the first to third cooling tubes C1 to C3 may remain in a solid state and maintain their shapes due to a difference in melting points. A stainless steel and an aluminum material that have high heat conductivity and different melting points may be used for forming the first to third cooling tubes C1 to C3 and the first to third cooling plates P1 to P3 in which the first to third cooling tubes C1 to C3 are embedded, so as to rapidly dissipate heat from the battery packs M1 to M3 contacting the first to third cooling plates P1 to P3 and the first to third cooling tubes C1 to C3.

In an embodiment, as described above, the first cooling tube C1 is embedded in the first cooling plate P1, the second cooling tube C2 is embedded in the second cooling plate P2, and the third cooling tube C3 is embedded in the third cooling plate P3. Therefore, the first cooling tube C1 may be arranged at the same level as the first cooling plate P1, that is, at the first level h1 corresponding to the bottom of the battery module, and the second cooling tube C2 may be arranged at the same level as the second cooling plate P2, that is, at the second level h2 higher than the bottom of the battery module. In addition, the third cooling tube C3 may be arranged at the same level as the third cooling plate P3, that is, at the third level h3 higher than the bottom of the battery module. In an embodiment, the second level h2 of the second cooling tube C2 may be equal to the third level h3 of the third cooling tube C3.

The first cooling tube C1 may be connected to the second cooling tube C2 through a front branch part D1. In an embodiment, external connection tubes E and the first and second cooling tubes C1 and C2 may be connected to the front branch part D1. A cooling medium introduced through the external connection tubes E may be distributed to the first and second cooling tubes C1 and C2 through the front branch part D1, and the cooling medium flowing in the first and second cooling tubes C1 and C2 may be collected at the front branch part D1 and discharged to the external connection tubes E. The cooling medium may flow as follows. The cooling medium introduced at a low temperature through the external connection tubes E and the front branch part D1 may be distributed to the first and second cooling tubes C1 and C2 and may exchange heat with the first and second groups of battery packs M1 and M2. Then, the cooling medium heated to a high temperature through the heat exchange may be collected at the front branch part D1 and may be discharged through the external connection tubes E connected to the front branch part D1.

As described later, the cooling medium flowing in the first cooling tube C1 may be distributed to the third cooling tube C3 through a rear branch part D2. That is, a portion of the cooling medium introduced into the first cooling tube C1 through the front branch part D1 may cool the first group of battery packs M1 and may flow back to the front branch part D1 through a bypass passage C12, and another portion of the cooling medium introduced into the first cooling tube C1 may flow to the third cooling tube C3 through the rear branch part D2.

The front branch part D1 may be located at a front position of the battery module, and the rear branch part D2 may be located at a rear position of the battery module. Reference numerals D1' in FIG. 2 and D1 in FIG. 6 both indicate the front branch part. However, since FIG. 2 illustrates only a portion (i.e. a lower portion) of the front branch part, the front branch part is indicated with a different reference numeral in FIG. 2. Similarly, reference numerals D2' in FIG. 2 and D2 in FIG. 6 both indicate the rear branch part. However, since FIG. 2 illustrates only a portion (i.e. a lower portion) of the rear branch part, the rear branch part is indicated with a different reference numeral in FIG. 2.

The first cooling tube C1 may be connected to the third cooling tube C3 through the rear branch part D2. The cooling medium may flow from the first cooling tube C1 to the third cooling tube C3 through the rear branch part D2, and after cooling the third group of battery packs M3, the cooling medium may return to the first cooling tube C1 through the rear branch part D2. In an embodiment, for example, a portion of the cooling medium flowing in the first cooling tube C1 may cool only the first group of battery packs M1 and may then bypass the rear branch part D2 through the bypass passage C12, and another portion of the cooling medium flowing in the first cooling tube C1 may cool the first group of battery packs M1 and then the third group of battery packs M3 through the rear branch part D2. In an embodiment, the bypass passage C12 and a passage C11 passing through the rear branch part D2 may be formed in parallel with each other along the first cooling tube C1, and the bypass passage C12 and the passage C11 are separate from each other by the front branch part D1 forming a start point and an end point of a circulation passage of the first cooling tube C1.

In an embodiment, since the bypass passage C12 is formed along the first cooling tube C1, heat may be efficiently dissipated from the first group of battery packs M1 having the greatest number of battery packs. For example, the cooling medium flowing through the bypass passage C12 may have a relatively low temperature and may thus efficiently cool the first group of battery packs M1 on a return path to the front branch part D1.

The first to third groups of battery packs M1 to M3 are distributed on the first to third cooling plates P1 to P3 arranged at different positions. In an embodiment, the first to third cooling tubes C1 to C3 may have different diameters so as to uniformly dissipate heat from the first to third groups of battery packs M1 to M3 distributed at a plurality of positions.

In an embodiment, since the first cooling tube C1 is used to dissipate heat from the first group of battery packs M1 having the greatest number of battery packs, the first cooling tube C1 may have the greatest diameter. In an embodiment, for example, the first cooling tube C1 may have a diameter of about 11 mm. The second cooling tube C2 is used to dissipate heat from the second group of battery packs M2 having the smallest number of battery packs and is close to the external connection tubes E having a relatively high pressure. Therefore, the second cooling tube C2 may have the smallest diameter so as to limit the flow rate of the cooling medium in the second cooling tube C2.

In an embodiment, for example, the passage of the first cooling tube C1 may include the passage C11 passing through the rear branch part D2, and the bypass passage C12 bypassing the rear branch part D2. In this case, the passage C11 that is longest and connected to the third cooling tube C3 through the rear branch part D2, that is, the longest passage C11 of the first cooling tube C1 connected to the third cooling tube C3, may have the largest diameter, for example, about 11 mm, and may thus have a relatively high flow rate. In addition, the bypass passage C12 of the first cooling tube C1 bypassing the rear branch part D2 may have a relatively small diameter, for example, about 9 mm, so as to maintain the flow rate of the cooling medium in the bypass passage C12 to be lower than the flow rate of the cooling medium in the passage C11 passing through the rear branch part D2. That is, since the bypass passage C12 of the first cooling tube C1 has a diameter smaller than the diameter of the passage C11 of the first cooling tube C1 passing through the rear branch part D2, the passage C11 of the first cooling tube C1 connected to the third cooling tube C3 and thus having a relatively high cooling load may have a relatively high flow rate of the cooling medium. For example, since the passage C11 of the first cooling tube C1 connected to the third cooling tube C3 farthest from the external connection tubes E is designed to have a relatively large diameter, the cooling medium flowing in the passage C11 may have a relatively low flow resistance and pressure drop, and thus the flow rate of the cooling medium in the passage C11 may be properly maintained.

In an embodiment, the second cooling tube C2 is used to dissipate heat from the second group of battery packs M2 having the smallest number of battery packs and is close to the external connection tubes E having a relatively high pressure. Therefore, the second cooling tube C2 may have the smallest diameter so as to limit the flow rate of the cooling medium in the second cooling tube C2. In an embodiment, for example, the second cooling tube C2 may have a diameter of about 6 mm.

Referring to FIG. 8, the first cooling plate P1 in which the first cooling tube C1 is embedded may have a flat upper portion and a lower portion protruding according to the shape of the first cooling tube C1. Due to this structure, the first group of battery packs M1 may be stably supported on a flat upper surface of the first cooling plate P1 while sufficiently making thermal contact with the flat upper surface of the first cooling plate P1, and a lower surface of the first cooling plate P1 may protrude according to the outer surface of the first cooling tube C1 to provide embedment of the first cooling tube C1 in the first cooling plate P1 and reduce the thickness of the first cooling plate P1 in regions in which the first cooling tube C1 is not arranged, thereby reducing material costs and the weight of the battery module. For example, when the first cooling plate P1 is formed, the lower portion of the first cooling plate P1 may be shaped according to the shape of a die (not shown) to surround the first cooling tube C1.

Leakage blocking structures of the front branch part D1 and the rear branch part D2 will now be described. Herein, leakage blocking for the front branch part D1 and the rear branch part D2 may refer to preventing or substantially preventing a fluid leaking through the front branch part D1 or the rear branch part D2 from permeating the battery packs M1 to M3. Since the front branch part D1 is a part through which the first and second cooling tubes C1 and C2 and the external connection tubes E are connected to each other, the possibility of leakage is relatively high at the front branch part D1. In addition, since the rear branch part D2 is a part through which the first and third cooling tubes C1 and C3 are connected to each other, the possibility of leakage is also relatively high at the rear branch part D2.

Referring to FIG. 6, the front branch part D1 may include first branch blocks 11 arranged at the first level h1, second branch blocks 12 arranged at the second level h2, and branch part connection tubes 13 connecting the first and second branch blocks 11 and 12 to each other. The first and second branch blocks 11 and 12 may be embedded in the first and second cooling plates P1 and P2, respectively. That is, the first branch blocks 11 may be embedded in the first cooling plate P1 together with the first cooling tube C1, and the second branch blocks 12 may be embedded in the second cooling plate P2 together with the second cooling tube C2. In an embodiment, since the first and second branch blocks 11 and 12 are embedded in the first and second cooling plates P1 and P2 and completely surrounded by the first and second cooling plates P1 and P2, leakage through the first and second branch blocks 11 and 12 may be prevented or substantially prevented, and permeation of leakage into the battery packs M1 to M3 may be prevented or substantially prevented.

The rear branch part D2 may include first branch blocks 21 arranged at the first level h1, third branch blocks 22 arranged at the third level h3, and branch part connection tubes 23 connecting the first and third branch blocks 21 and 22 to each other. The first and third branch blocks 21 and 22 may be embedded in the first and third cooling plates P1 and P3, respectively. That is, the first branch blocks 21 may be embedded in the first cooling plate P1 together with the first cooling tube C1, and the third branch blocks 22 may be embedded in the third cooling plate P3 together with the third cooling tube C3. In an embodiment, since the first and third branch blocks 21 and 22 are embedded in the first and third cooling plates P1 and P3 and completely surrounded by the first and third cooling plates P1 and P3, leakage through the first and third branch blocks 21 and 22 may be prevented or substantially prevented, and permeation of leakage into the battery packs M1 to M3 may be prevented or substantially prevented.

Sealing structures of the front branch part D1 and the rear branch part D2 will now be described. The external connection tubes E, the first cooling tube C1, and the branch part connection tubes 13 may be connected to the first branch blocks 11 of the front branch part D1. In an embodiment, brazing may be used between the first branch blocks 11 and the external connection tubes E, between the first branch blocks 11 and the first cooling tube C1, and between the first branch blocks 11 and the branch part connection tubes 13. Similarly, brazing may be used for the second branch blocks 12 of the front branch part D1. In an embodiment, brazing is used for the first and second branch blocks 11 and 12 to which many tubes are connected, and leakage between the first and second branch blocks 11 and 12 and the tubes may be prevented or substantially prevented.

Figure 9A:
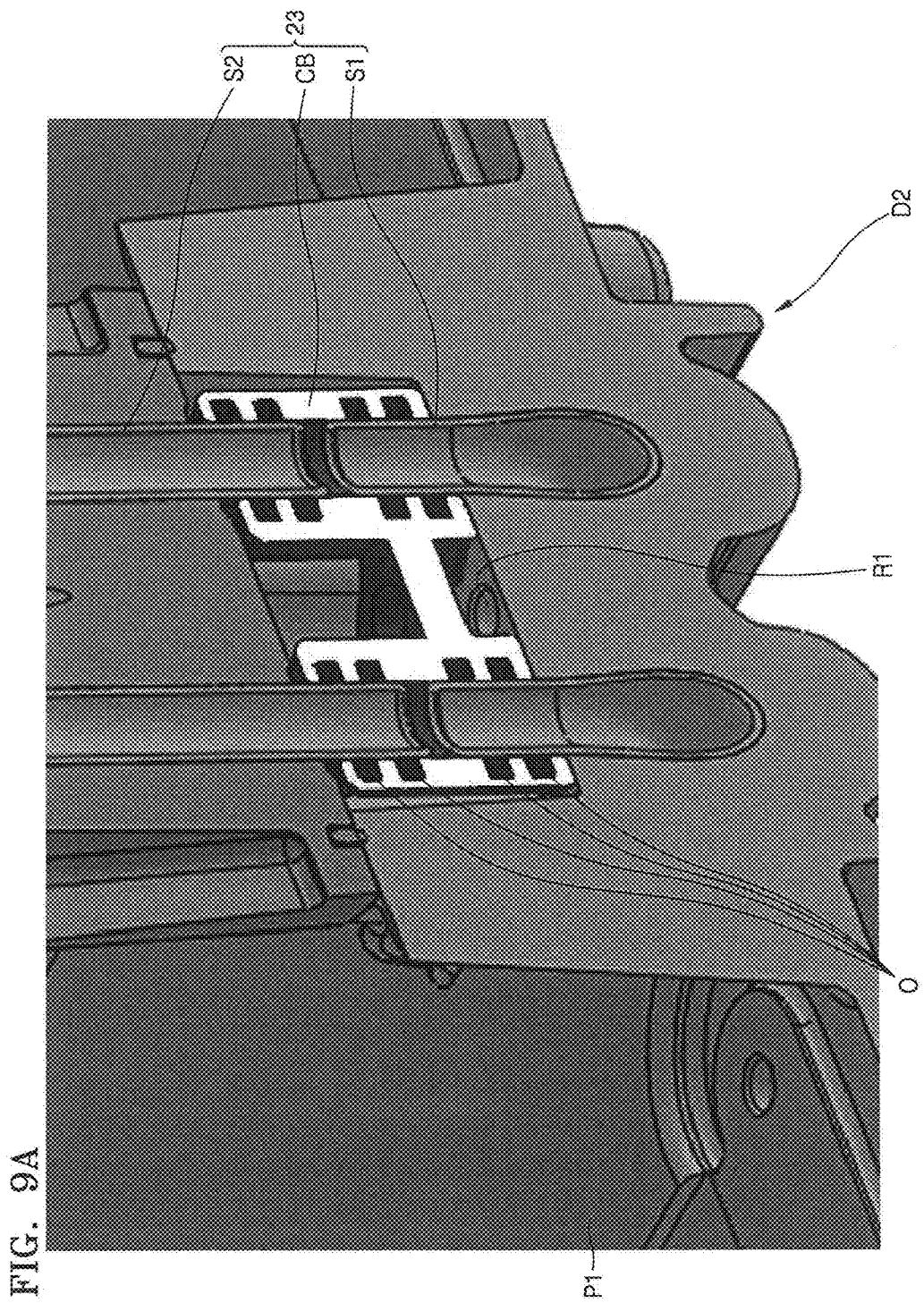

FIGS. 9A and 9B are cross-sectional views taken along line IX-IX of FIG. 3, illustrating a double sealing structure and a drain hole R1 for the rear branch part D2.

Referring to FIGS. 9A and 9B, a double sealing structure may be applied to the branch part connection tubes 23 of the rear branch part D2. Each of the branch part connection tubes 23 may include a first sub-connection tube S1 connected from the first cooling tube C1, a second sub-connection tube S2 connected from the third cooling tube C3, and a connection block CB connecting the first and second sub-connection tubes S1 and S2 to each other. In this case, the connection block CB may fluid-tightly seal the first and second sub-connection tubes S1 and S2 while surrounding the first and second sub-connection tubes S1 and S2, and, in an embodiment, sealing members O may be provided between an inner circumferential surface of the connection block CB and outer circumferential surfaces of the first and second sub-connection tubes S1 and S2. In an embodiment, for example, two sealing members O may be provided in an overlapping manner between the inner circumferential surface of the connection block CB and the outer circumferential surface of the first sub-connection tube S1. Similarly, two sealing members O may be provided in an overlapping manner between the inner circumferential surface of the connection block CB and the outer circumferential surface of the second sub-connection tube S2. The sealing members O may be elastic members, such as rubber O-rings surrounding the outer circumferential surfaces of the first and second sub-connection tubes S1 and S2. In FIGS. 9A and 9B, for conciseness of illustration, installation places of the sealing members O inside the connection block CB are illustrated instead of illustrating the sealing members O.

In an embodiment, as described above, fluid-tight connection not allowing leakage may be formed for the front branch part D1 by a brazing method, and a double sealing structure may be applied to the rear branch part D2 for fluid-tight connection not allowing leakage. In this case, unlike the brazing method being an integral coupling method, the double sealing structure applied to the rear branch part D2 may not perfectly prevent leakage depending on the pressure of the cooling medium. For example, the double sealing structure may be applied to the rear branch part D2 for detachably connecting the first cooling plate P1 (or the first cooling tube C1) and the third cooling plate P3 (or the third cooling tube C3) to each other while providing sealing therebetween. However, the possibility of leakage may be relatively higher in the case of using the double sealing structure than in the case of using the brazing method.

Thus, the drain hole R1 may be formed in a region adjacent to the rear branch part D2. For example, the drain hole R1 may be formed in the first cooling plate P1 below the rear branch part D2. Although a fluid may leak through the rear branch part D2, for example, through the connection block CB, the fluid may be discharged through the drain hole R1 of the first cooling plate P1, and the fluid may not permeate the battery packs M1 to M3. For example, the drain hole R1 may be a through-hole formed through the first cooling plate P1.

Referring to FIGS. 6 and 7, each of the first to third cooling tubes C1 to C3 may include a plurality of tubes. In an embodiment, for example, each of the first to third cooling tubes C1 to C3 may include a plurality of tubes extending in parallel with each other to uniformly or substantially uniformly supply the cooling medium over the entire areas of the first to third cooling plates P1 to P3 on which the battery packs M1 to M3 are supported and thus to uniformly or substantially uniformly dissipate heat from the entire areas of the first to third cooling plates P1 to P3. For example, each of the first to third cooling tubes C1 to C3 may include a plurality of tubes to form circulation passages including introduction passages extending from the external connection tubes E, and discharge passages extending to the external connection tubes E. In an embodiment, fixing blocks FB may be provided between the plurality of tubes extending in parallel with each other and forming the first to third cooling tubes C1 to C3.

Each of the fixing blocks FB may have a function of combining neighboring tubes as a bundle, a function of maintaining the neighboring tubes at regular intervals, and a function of supporting the neighboring tubes. In addition, when the first to third cooling plates P1 to P3 are formed integrally with the first to third cooling tubes C1 to C3, the fixing blocks FB may function as jigs maintaining the positions of the first to third cooling tubes C1 to C3 against a flow of molten metal. For example, the first to third cooling tubes C1 to C3 may be temporarily fixed to an inside of a die (not shown) for forming the first to third cooling plates P1 to P3, and a molten metal may be injected into the die in which the first to third cooling tubes C1 to C3 are temporarily fixed, so as to form the first to third cooling plates P1 to P3 integrally with the first to third cooling tubes C1 to C3. In this case, the fixing blocks FB may combine the plurality of tubes of each of the first to third cooling tubes C1 to C3 and maintain the positions of the plurality of tubes of each of the first to third cooling tubes C1 to C3 against the pressure of the molten metal injected at a high pressure.

For example, the plurality of tubes combined by the fixing blocks FB may be placed in the die (not shown) for forming the first to third cooling plates P1 to P3, and upper portions of the fixing blocks FB may be pressed using an external jig (not shown) so as to fix the positions of the fixing blocks FB and thus to fix the positions of the plurality of tubes in the die (not shown). That is, the fixing blocks FB may fix the plurality of tubes of each of the first to third cooling tubes C1 to C3 relative to each other and may provide pressing points for an external jig (not shown) so as to embed the first to third cooling tubes C1 to C3 at uniform depths in the first to third cooling plates P1 to P3 while fixing the first to third cooling tubes C1 to C3 and preventing the first to third cooling tubes C1 to C3 from protruding outward from the first to third cooling plates P1 to P3. In this case, since the fixing blocks FB provide pressing points for an external jig (not shown) and maintain contact with the external jig when a molten metal is injected, the fixing blocks FB may be exposed at least one of upper and lower surfaces of the first to third cooling plates P1 to P3 after the first to third cooling plates P1 to P3 are completely formed.

The fixing blocks FB may be embedded in the molten metal so as to be embedded in the first to third cooling plates P1 to P3. The fixing blocks FB may include the same metallic material as that included in the first to third cooling plates P1 to P3. In an embodiment, for example, the fixing blocks FB and the first to third cooling plates P1 to P3 may include an aluminum material. That is, the fixing blocks FB may be embedded in molten aluminum for forming the first to third cooling plates P1 to P3 and may solidify while combining with the first to third cooling plates P1 to P3 without gaps, that is, without defects, such as cracks. For example, the fixing blocks FB and the first to third cooling plates P1 to P3 including the same material and thus having the same material characteristics may make tight contact with each other and firmly couple to each other while being cooled and solidified.

Referring to FIG. 7, a fixing block FB may include upper and lower units FB1 and FB2 facing each other and coupled to each other with the first cooling tube C1 therebetween; and a coupling unit FB3 fastening the upper and lower units FB1 and FB2 to each other.

Figure 10:
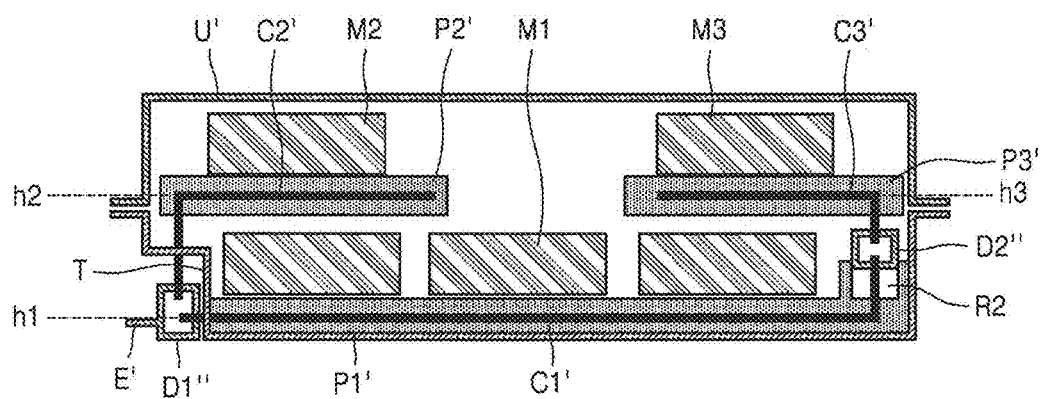
FIG. 10 is a cross-sectional view illustrating a battery module according to another embodiment.

FIG. 10 is a cross-sectional view illustrating a battery module according to another embodiment. Referring to FIG. 10, the battery module may include first to third cooling plates P1' to P3' supporting first to third groups of battery packs M1 to M3 and making thermal contact with the first to third groups of battery packs M1 to M3 for dissipating heat from the first to third groups of battery packs M1 to M3. The first cooling plate P1' may be arranged at a first level h1 corresponding to a bottom of the battery module, the second cooling plate P2' may be arranged at a second level h2 higher than the first level h1, and the third cooling plate P3' may be arranged at a third level h3 higher than the first level h1. First to third cooling tubes C1' to C3' for circulating a cooling medium may be integrally embedded in the first to third cooling plates P1' to P3'. A cover U' may be arranged on the first cooling plate P1' so as to form an accommodation space in which the first to third groups of battery packs M1 to M3 are arranged.

The first and second cooling tubes C1' and C2' may be connected to each other through a front branch part D1", and the first and third cooling tubes C1' and C3' may be connected to each other through a rear branch part D2". In this case, the front branch part D1" may be located outside the accommodation space. Since the front branch part D1" is a part through which the first and second cooling tubes C1' and C2' are connected to external connection tubes E', the possibility of leakage is relatively high at the front branch part D1". Therefore, the front branch part D1" is arranged outside the accommodation space sealed by the first cooling plate P1' and the cover U' so as to prevent or substantially prevent a fluid leaking through the front branch part D1" from permeating the first to third groups of battery packs M1 to M3. In an embodiment, a stepped portion T may be formed on the first cooling plate P1' to define an installation space for the front branch part D1". Due to the stepped portion T, the front branch part D1" may be arranged outside the first cooling plate P1' at the same level as the first cooling tube C1'.

The rear branch part D2" may be arranged inside the accommodation space sealed by the first cooling plate P1' and the cover U'. Since the rear branch part D2" is a part through which the first and third cooling tubes C1' and C3' are connected to each other, the possibility of leakage is also relatively high at the rear branch part D2". However, the rear branch part D2" is arranged inside the accommodation space so as to prevent or substantially prevent the rear branch part D2" from protruding from a rear side of the battery module and provide a position arrangement structure for assembling the battery module. For example, when the battery module is mounted to an inside of a vehicle, a rear end of the battery module may be used as a reference end, and an assembly tolerance may be allowed at a front side of the battery module such that a protruding structure of the front branch part D1" may not be damaged during assembly. An accommodation recess R2 or a drain hole may be formed in the rear branch part D2" to collect or discharge a leaking fluid such that a fluid leaking through the rear branch part D2" may not permeate the first to third groups of battery packs M1 to M3.

According to an aspect of embodiments of the present invention, heat may be efficiently dissipated from the battery packs of the battery module, and heat dissipating efficiency may not vary according to the positions of the battery packs; that is, heat may be uniformly dissipated. In addition, leakage of a cooling medium may be prevented, and permeation of the cooling medium into the battery packs may be prevented.

It is to be understood that the embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A battery module comprising:
   a first cooling plate supporting a first group of battery packs, and a first cooling tube embedded in the first cooling plate;
   a second cooling plate supporting a second group of battery packs, and a second cooling tube embedded in the second cooling plate;
   a third cooling plate supporting a third group of battery packs, and a third cooling tube embedded in the third cooling plate;
   an external connection tube inlet portion connected to an outside of the battery module to introduce a cooling medium into the battery module; and
   an external connection tube outlet portion connected to the outside of the battery module to discharge the cooling medium to the outside,
   wherein a portion of the first cooling tube embedded in the first cooling plate, the third cooling tube, and another portion of the first cooling tube embedded in the first cooling plate are sequentially connected in series between the external connection tube inlet portion and the external connection tube outlet portion,
   wherein the second cooling plate is arranged at a second level higher than a first level of the first cooling plate defining a bottom of the battery module.

2. The battery module of claim 1, wherein the third cooling plate is arranged at a third level higher than the first level.

3. The battery module of claim 1, wherein the second cooling plate and the third cooling plate are spaced apart from each other.

4. The battery module of claim 1, wherein
   the second cooling plate extends in parallel with a lengthwise part of the first cooling plate, the lengthwise part extending in a first direction, and
   the third cooling plate extends in parallel with a widthwise part of the first cooling plate, the widthwise part extending in a second direction.

5. The battery module of claim 1, wherein
   the first cooling tube and the second cooling tube are connected to each other through a front branch part, and
   the first cooling tube and the third cooling tube are connected to each other through a rear branch part.

6. The battery module of claim 5, wherein the first cooling tube comprises:
   a passage passing through the rear branch part and connected to the third cooling tube; and
   a bypass passage bypassing the rear branch part.

7. The battery module of claim 6, wherein the passage passing through the rear branch part has a diameter greater than a diameter of the bypass passage.

8. The battery module of claim 6, wherein the passage passing through the rear branch part has a largest diameter among the first to third cooling tubes.

9. The battery module of claim 5, wherein a drain hole is formed in a region adjacent to the rear branch part to discharge a fluid through the rear branch part.

10. The battery module of claim 9, wherein the drain hole is formed in the first cooling plate below the rear branch part.

11. The battery module of claim 5, wherein the first cooling tube, the second cooling tube, and an external connection tube are connected to the front branch part.

12. The battery module of claim 11, wherein the second cooling tube has a diameter smaller than a diameter of the first cooling tube.

13. The battery module of claim 11, wherein the second cooling tube has a smallest diameter among the first to third cooling tubes.

14. The battery module of claim 5, wherein
   the front branch part to which the first cooling tube and the second cooling tube are connected is arranged outside a battery pack accommodation space, and
   the rear branch part to which the first cooling tube and the third cooling tube are connected is arranged in the battery pack accommodation space.

15. The battery module of claim 14, further comprising a cover facing the first cooling plate and coupled to the first cooling plate, wherein the first cooling plate and the cover together define the battery pack accommodation space.

16. The battery module of claim 1,
   wherein each of the first to third cooling tubes comprises a plurality of tubes extending in parallel with each other, and
   wherein the battery module further comprises a fixing block combining the plurality of tubes of each of the first to third cooling tubes.

17. The battery module of claim 16, wherein the fixing block comprises:
   upper and lower units facing each other and coupled to each other with the plurality of tubes therebetween; and
   a coupling unit fastening the upper and lower units to each other.

18. The battery module of claim 16, wherein the fixing block comprises a same metal as that included in the first to third cooling plates.

19. The battery module of claim 16, wherein the fixing block is exposed at least one of upper and lower surfaces of the first to third cooling plates.

20. The battery module of claim 1, wherein
the first to third cooling plates comprise a first metal, and
the first to third cooling tubes comprise a second metal having a melting point higher than a melting point of the first metal.

* * * * *